United States Patent
Hung

(10) Patent No.: US 6,833,642 B1
(45) Date of Patent: Dec. 21, 2004

(54) AUTOMATIC ELECTRIC POWER GENERATING DEVICE FOR WHEELS

(76) Inventor: Pao-Chuang Hung, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 10/736,615

(22) Filed: Dec. 17, 2003

(51) Int. Cl.[7] .......................... H02K 1/00; H02K 1/12; H02K 1/22; H02K 7/00; B62J 6/12
(52) U.S. Cl. .................. 310/75 C; 310/257; 310/263; 29/1 R; 180/65.5; 280/288.4
(58) Field of Search .................. 310/75 C, 257, 310/263, 166; 29/1 D, 1 R; 180/205–206, 65.1–65.8, 220, 291; 280/288.4; 362/72, 192

(56) References Cited

U.S. PATENT DOCUMENTS

| | | | | |
|---|---|---|---|---|
| 3,548,965 A | * | 12/1970 | Pierro ....................... | 180/65.5 |
| 4,860,176 A | * | 8/1989 | Bauwens et al. ......... | 310/67 A |
| 5,828,145 A | * | 10/1998 | Nakamura ................. | 310/67 A |
| 6,409,197 B1 | * | 6/2002 | Endo et al. ............... | 280/288.4 |
| 6,590,306 B2 | * | 7/2003 | Terada ....................... | 310/75 C |
| 6,703,716 B2 | * | 3/2004 | Chiu .......................... | 290/1 R |

* cited by examiner

Primary Examiner—Tran Nguyen
(74) Attorney, Agent, or Firm—Troxell Law Office, PLLC

(57) ABSTRACT

An automatic electric power generating device for wheels includes a wheel hub and a housing. The wheel hub is provided with a first magnetic pole set and a second magnetic element. The first magnetic pole set has a spool, and left and right magnetic poles. The spool is winded with a coil having a guiding end thereof connected to an illuminating element installed at the wheel hub. The housing is provided with a first magnetic element and a second magnetic pole set. The second magnetic pole set has a spool, and left and right magnetic poles. The spool is winded with a coil having a guiding end thereof connected to a lighting device. Through rotations of the wheel, induction is generated between the driven and rotating magnetic pole sets and the magnetic elements.

6 Claims, 5 Drawing Sheets

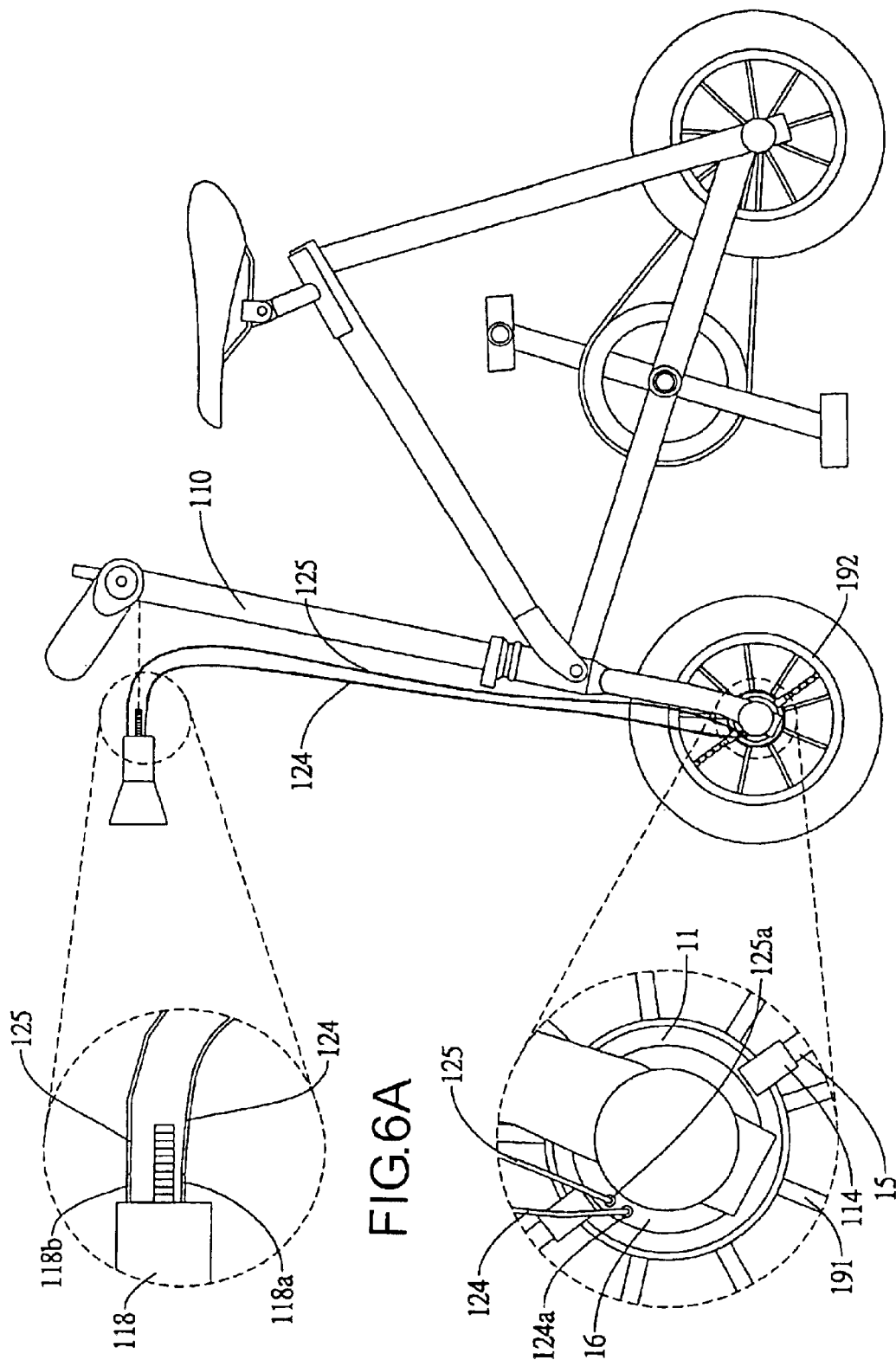

US 6,833,642 B1

AUTOMATIC ELECTRIC POWER GENERATING DEVICE FOR WHEELS

BACKGROUND OF THE INVENTION (a) Field of the Invention

The invention relates to an automatic electric power generating device of a wheel, and more particularly, to an automatic electric power generating device disposed at a wheel and capable of generating electric power using induction between magnetic pole plates and magnetic elements.

(b) Description of the Prior Art

A common electric power generating device for wheels has minimized weight and volume; however, a shortcoming thereof as being capable of providing only small amounts of electric power still needs to be advanced. Supposed two or more electronic equipments consuming electricity are installed at other certain locations of a vehicle, or two or more lighting devices serving for different functions are individually devised at the wheel and a vehicle body, it is probable that the electric power generated cannot be fully utilized by not being able to overcome shortcomings as providing insufficient electric power or linking the installed locations.

SUMMARY OF THE INVENTION

To overcome the aforesaid shortcomings, the primary object of the invention is to provide an automatic electric power generating device capable of supplying other equipments at a vehicle body with electric power.

The secondary object of the invention is to provide an automatic electric power generating device that can be devised with a plurality of additional magnetic pole sets and a plurality of additional magnetic elements.

BRIEF DESCRIPTION OF THE DRAWINGS

FIG. 6 shows an elevational schematic view illustrating a lighting device being installed to a front portion of a seat in a preferred embodiment according to the invention.

FIG. 6A shows an enlarged partial schematic view illustrating pins of a lighting device in FIG. 6.

FIG. 6B shows an enlarged partial schematic view illustrating a receiving member in FIG. 6.

DETAILED DESCRIPTION OF THE PREFERRED EMBODIMENT

To better understand the invention, detailed descriptions of a preferred embodiment shall be given with the accompanying drawings below.

Figure 1:
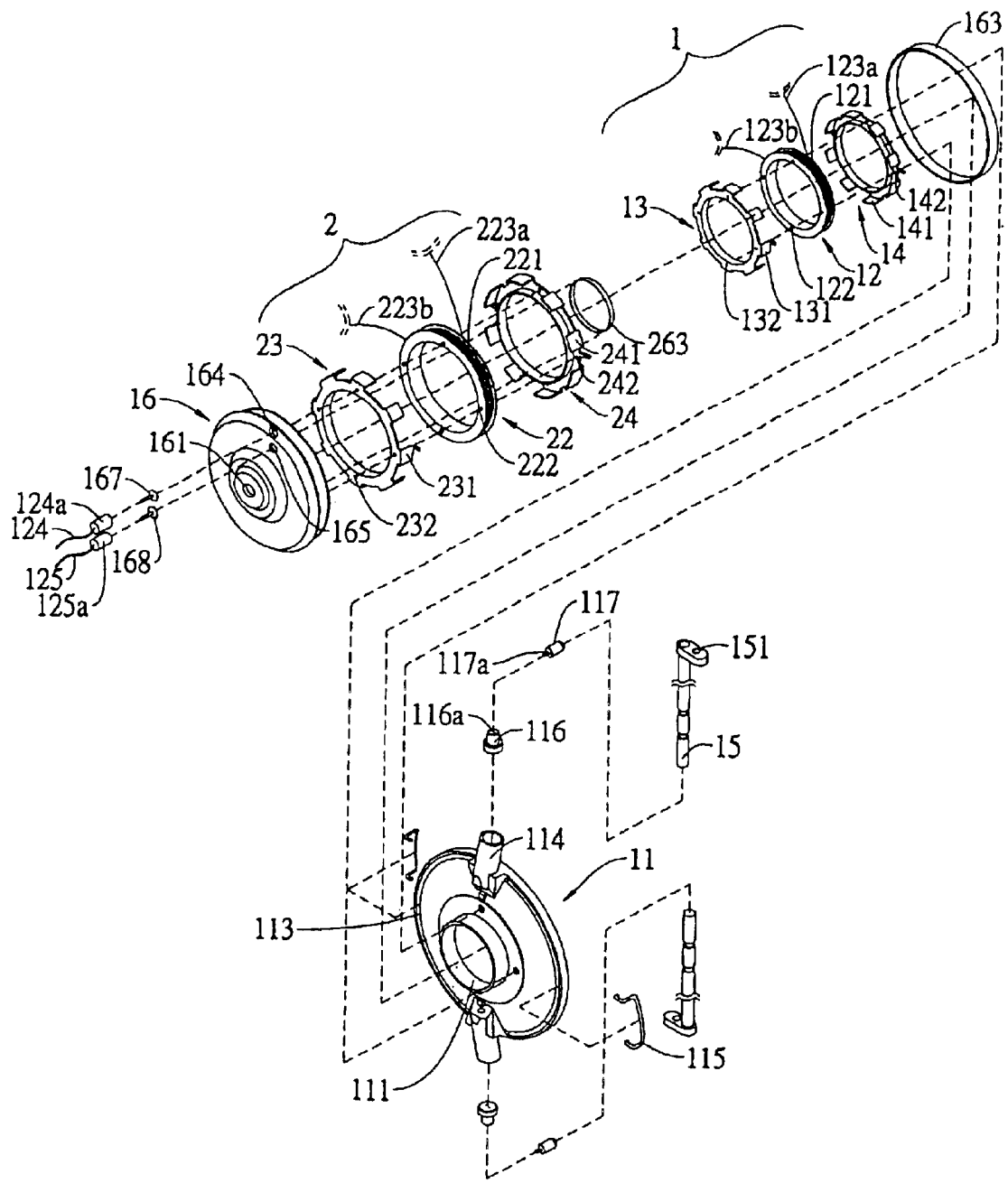
FIG. 1 shows an exploded elevational schematic view of a preferred embodiment according to the invention.
Figure 2:
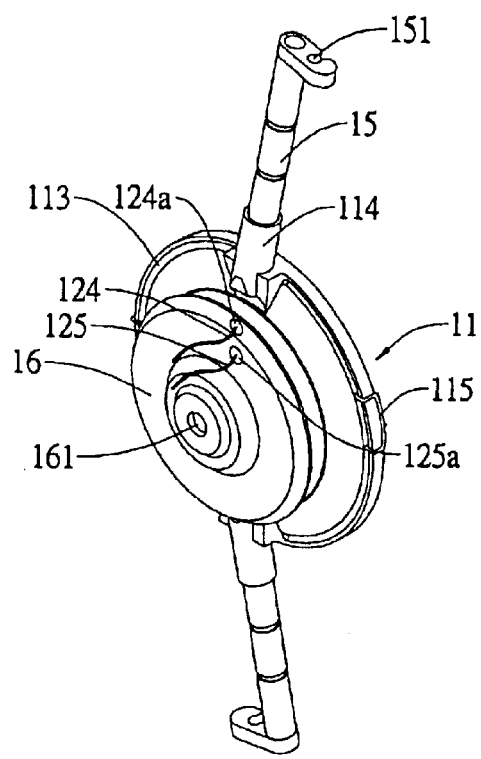
FIG. 2 shows an elevational schematic view of a preferred embodiment according to the invention.
Figure 3:
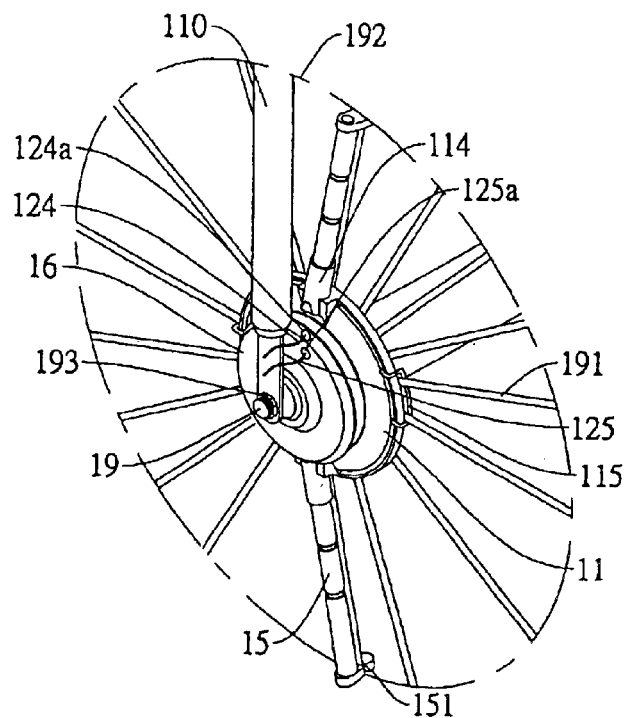
FIG. 3 shows an exploded elevational schematic view illustrating a preferred embodiment being installed to a wheel axle according to the invention.
Figure 4:
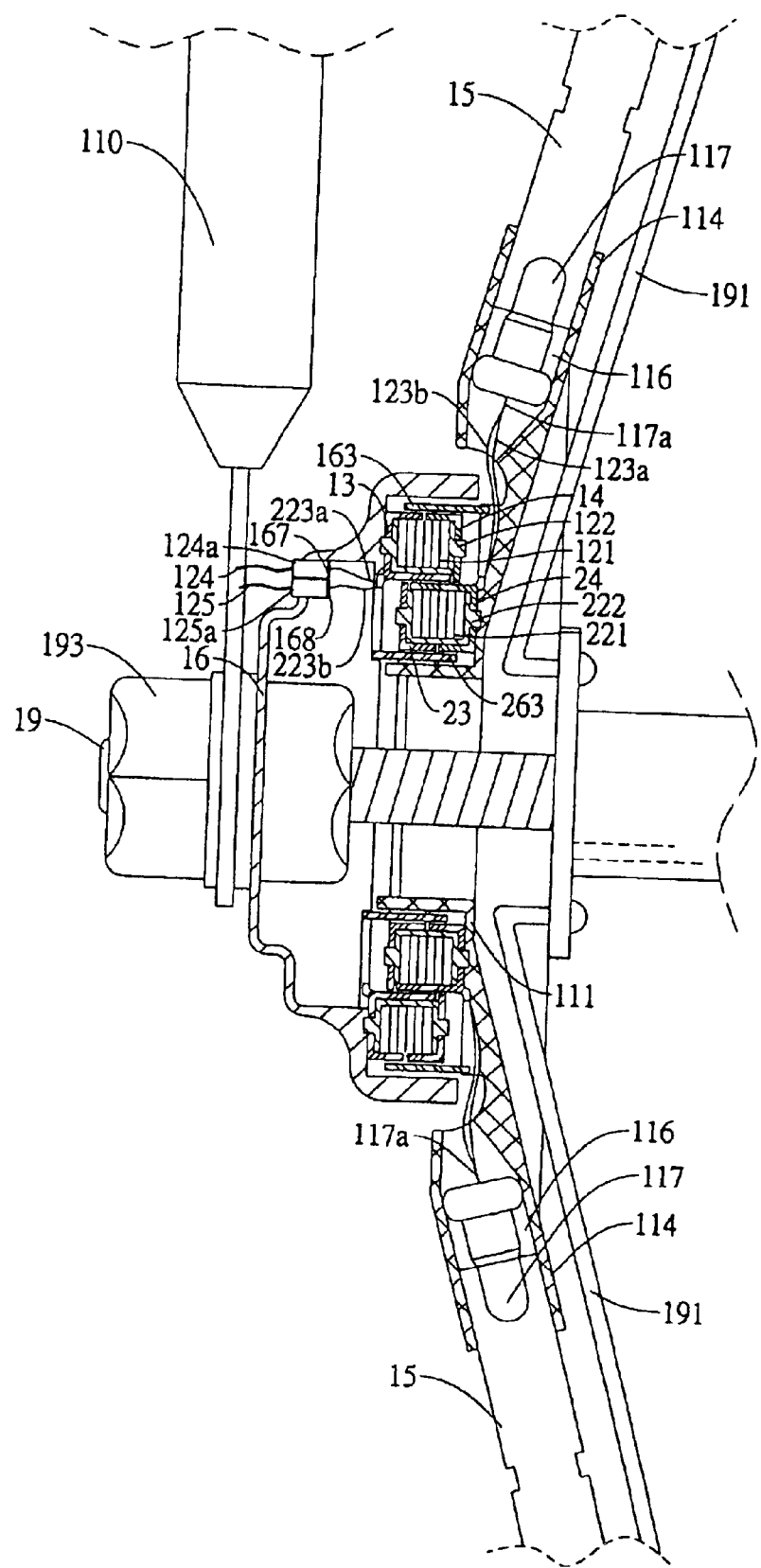
FIG. 4 shows a sectional schematic view illustrating a preferred embodiment being installed to a wheel axle according to the invention.
Figure 5:
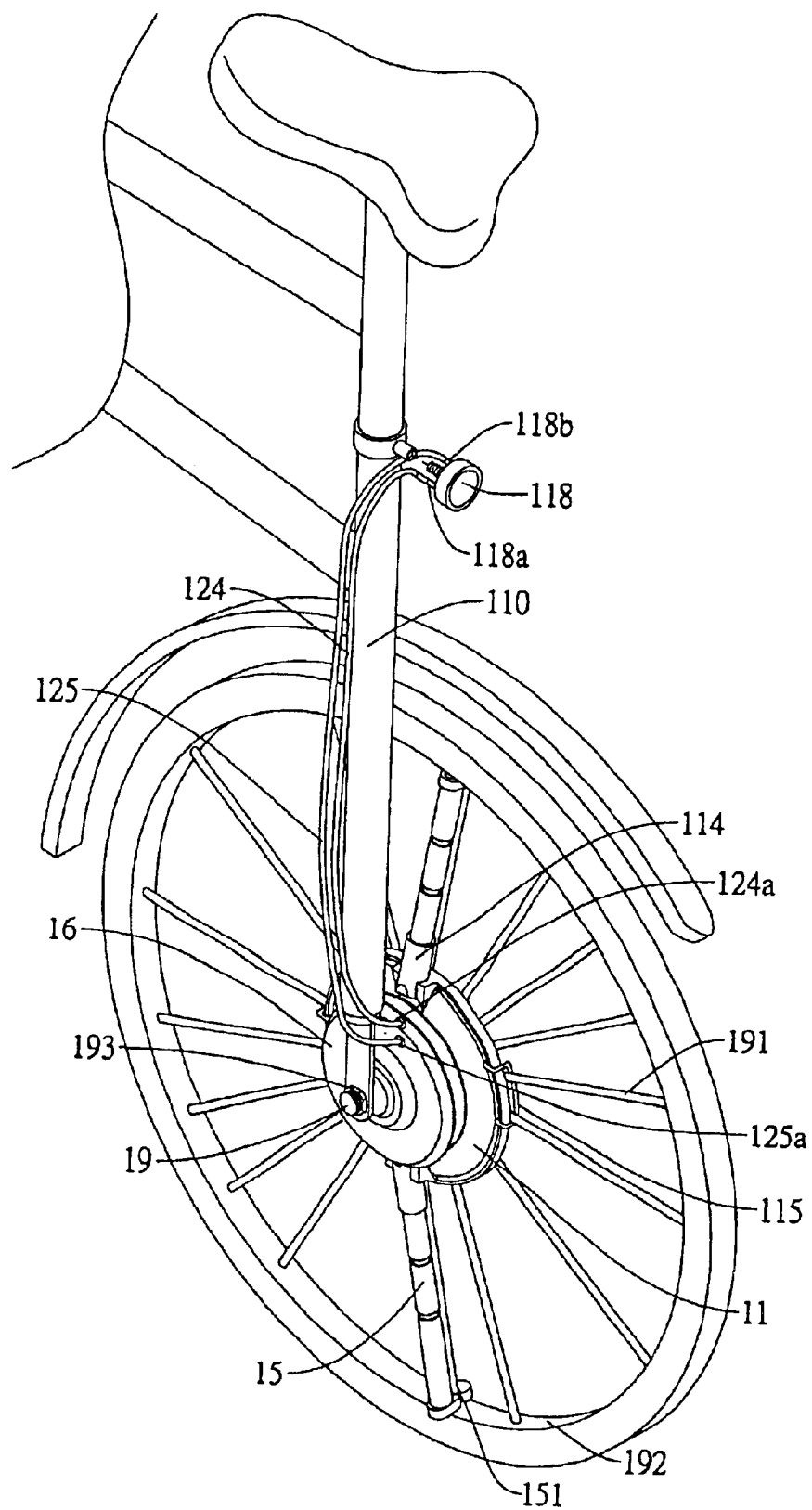
FIG. 5 shows an elevational schematic view illustrating a lighting device being installed behind a seat in a preferred embodiment according to the invention.

With reference to FIGS. 1, 2, 3, 4 and 5 showing an automatic electric power generating device for wheels in a preferred embodiment according to the invention, the invention comprises:

a wheel hub 11 having an extended hollow column 111 for penetrating with a wheel bearing 19, a wheel groove 113 at an outer edge thereof, two fastened hollow tubes 114, and two hook members 114 clasped in the groove 113; wherein, each hook member 114 has one end thereof first clasped in the groove 113, passed through a wheel axle 191 of the wheel, and the other end thereof clasped in the groove 113, thereby fastening the wheel hub 11 at a center of the wheel;

a first magnetic pole set 1 having a spool 12, a left magnetic pole 13, and a right magnetic pole 14; wherein, the spool 12 is vertically excavated to appear as an H-shaped structure with a guiding coil 121 winded therein, and has a plurality of locating protrusions 122 at two sides thereof; the left and right magnetic poles 13 and 14 are ring-shaped and are extended downward to respectively form a plurality of equidistant magnetic pole plates 131 and 141 at outer edges thereof, with the magnetic pole plates 131 and 141 being alternately located; the magnetic poles 13 and 14 further have two sides thereof drilled to form a plurality of through holes 132 and 142 that accommodate and fasten with the protrusions 122 of the spool 12, so as to tightly enclose the spool 12 within the two magnetic poles 13 and 14; and an assembled structure of the left and right magnetic poles 13 and 14, and the spool 12, is placed around an outer periphery of the hollow column 111 of the wheel hub 11;

a second magnetic element 163 assembled to the wheel hub 11;

a stopper 116 accommodated in the hollow column 114 of the wheel hub 11, and drilled with two through holes 116a for inserting with pins 117a of an illuminating element 117 having a single color or multiple colors; wherein, guiding ends 123a and 123b of the guiding coil 121 winded around aforesaid spool 12 are connected with the pins 117a of the illuminating element 117, so as to accommodate and fasten the illuminating element 117 in the hollow column 114 of the wheel hub 11;

a light-guide post 15 having one end thereof accommodated and fixed in the hollow column 114 of the wheel hub 11, allowing an inner periphery of an end thereof to accommodate the illuminating element 117, and provided with a hook member 151 at an upper end thereof; wherein, the hook member 151 is first butted against a steel ring 192 of the wheel and then clasped at the wheel axle 191 of the wheel to fasten the light-guide post 15;

a housing 16 having an opening 161 at an upper center portion thereof for penetrating with and fastening the wheel bearing 19, and two through holes 164 and 165 for disposing two inserting members 167 and 168, which are for connecting with wires 124 and 125 having receiving members 124a and 125a in front; wherein, a pin 118a of a lighting device 118 is joined with the wire 124, and a pin 118b of the lighting device 118 is joined with the wire 125;

a second magnetic pole set 2 having a spool 22, a left magnetic pole 23 and a right magnetic pole 24; wherein, the spool 22 is vertically excavated to appear as an H-shaped structure with a guiding coil 221 winded therein, and has a plurality of locating protrusions 222 at two sides thereof; the left and right magnetic poles 23 and 24 are ring-shaped and are extended downward to respectively form a plurality of equidistant magnetic pole plates 231 and 241 at outer edges thereof, with the magnetic pole plates 231 and 241 being alternately located; the magnetic pole 23 and 24 further have two sides thereof drilled to form a plurality of through holes 232 and 242 that accommodate and fasten with the protrusions 222 of the spool 22, so as to tightly enclose the spool 22 within the two magnetic poles 23 and 24; an assembled structure of the left and right magnetic poles 23 and 24, and the spool 22, is placed around the housing 16; and guiding ends 223a and 223b of the guiding coil 221 winded around aforesaid spool 22 are connected with the aforesaid inserting member 168; and a first magnetic element 263 disposed at the housing 16.

For assembly, the housing 16 is adjusted to place the spool 12, the left and right magnetic poles 13 and 14 of the first magnetic pole set 1 along with the second magnetic element 163 therein without having the various elements coming into contact with one another. The spool 22 and the left and right magnetic poles 23 and 24 of the second magnetic pole set 2 along with the first magnetic element 263 are placed in the wheel hub 11 without coming into contact with one another. The magnetic pole plates 131 and 141 of the left and right magnetic poles 13 and 14 of the first magnetic pole set 1 are corresponded with the first magnetic element 263. The magnetic pole plates 231 and 241 of the left and right magnetic poles 23 and 24 of the second magnetic pole set 2 are corresponded with the second magnetic element 163. A hook member 115 has one end thereof first clasped in the groove 113 and passed through the wheel axle 119 of the wheel, and then the other end thereof clasped in the groove 113, so as to fix the wheel hub 11 at a center of the wheel. An outer end of the wheel bearing 19 is joined with a vehicle body 110 and fastened using a screw nut 193.

Through rotations of the wheel, the first magnetic pole set 1 and the second magnetic element 163 at the wheel hub 11 are rotated. Electric power is generated by induction between the immobile second magnetic pole set 2 and the first magnetic element 163 at the housing 16, and the rotating first magnetic pole set 1 and the second magnetic element 163 at the wheel hub 11. Using the guiding ends 123a and 123b of the guiding coil 121 winded around the spool 12 and connected with inserting pins 117a of the illuminating element 117, the illuminating device 117 is driven and illuminated. The guiding end 223a of the guiding coil 221 winded around the spool 22 is connected to the inserting member 167, and the guiding end 223b of the guiding coil 221 winded around the spool 22 is connected to the inserting member 168. The wires 124 and 125 having the 124a and 125a in front are respectively connected to the inserting members 167 and 168. The wire 124 is connected to the pin 118a of the lighting device 118, and the wire 125 is connected to the other pin 118b of the lighting device 118, thereby driving the lighting device 118 for illumination. Therefore, the second magnetic element 163, the first magnetic pole set 1, the second magnetic pole set 2 and the first magnetic element 263 provide not only the illuminating element 117 at the wheel but also the lighting device 118 at the vehicle body 110 with electric power.

Furthermore, the lighting device 118 in the aforesaid preferred embodiment is disposed behind a seat. However, a location of the lighting device 118 is not to be limited to locations behind the seat. The lighting device 118 can also be installed at a front portion of the vehicle body 110 as shown in FIG. 6, or can be a lighting device installed at any locations of the vehicle body 110 and any electric power driven devices installed at any location.

Based on actual needs, the wheel hub 11 may be disposed with additional magnetic pole sets, and the housing 16 may similarly disposed with additional magnetic elements for corresponding with the magnetic pole sets; and the housing 16 may be disposed with additional magnetic elements, and the wheel hub 11 may be disposed with additional magnetic pole sets for corresponding with the magnetic elements.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. An automatic electric power generating device for wheels, comprising:

a wheel hub having a hollow column extended from a center thereof, a first magnetic pole set and a second magnetic element; wherein, the first magnetic pole set has a spool, a left magnetic pole and a right magnetic pole; the spool is wound with a coil having one guiding end thereof connected to a first electric power driven device; the left and right magnetic poles are ring-shaped and are extended downward to respectively form a plurality of equidistant magnetic pole plates at outer edges thereof, with the magnetic pole plates being alternately located when the left and right magnetic poles are fastened to each other to tightly enclose the spool therein; and an assembled structure of the aforesaid elements is fixed to the wheel hub;

a housing having an opening at a center portion thereof, a first magnetic element and a second magnetic pole set; wherein, the second magnetic pole set is consisted of a spool, a left magnetic pole and a right magnetic pole; the spool is wounded with a coil having one guiding end thereof connected to a second electric power driven device; the left and right magnetic poles are ring-shaped and are extended downward to respectively form a plurality of equidistant magnetic pole plates at outer edges thereof, with the magnetic pole plates being alternately located when the left and right magnetic poles are fastened to each other to tightly enclose the spool therein; the spool and the left and right magnetic poles of the first magnetic pole set, and the second magnetic element, are placed in the housing without coming into contact with one another; the spool and the left and right magnetic poles of the second magnetic pole set, and the first magnetic element, are placed in the wheel hub without coming into contact with one another; the magnetic plates of the left and right magnetic poles of the first magnetic pole set are corresponded with the first magnetic element; and the magnetic plates of the left and right magnetic poles of the second magnetic pole set are corresponded with the second magnetic element; and through rotations of the wheel, the first magnetic pole set and the second magnetic element at the wheel hub are rotated; electric power is generated by induction between the immobile second magnetic pole set and the first magnetic element at the housing, and the rotating first magnetic pole set and the second magnetic element at the wheel hub, thereby driving the first electric power driven device and providing the second electric power driven device with electric power and accomplishing automatically generating electric power without requiring any electric cells.

2. The automatic electric power generating device for wheels in accordance with claim 1, wherein the wheel hub may be disposed with additional magnetic pole sets, and the housing may be disposed with additional magnetic elements for corresponding with the magnetic poles sets at the wheel hub.

3. The automatic electric power generating device for wheels in accordance with claim 1, wherein the wheel hub may be disposed with additional magnetic elements, and the housing may be disposed with additional magnetic poles sets for corresponding with the magnetic elements at the wheel hub.

4. The automatic electric power generating device for wheels in accordance with claim 1, wherein the first electric power driven device is an illuminating element.

5. The automatic electric power generating device for wheels in accordance with claim 1, wherein the second electric power driven device is a lighting device installed behind a seat.

6. The automatic electric power generating device for wheels in accordance with claim 1, wherein the second electric power driven device is a lighting device installed at a front portion of a vehicle.

* * * * *